United States Patent [19]

Ishimura et al.

[11] Patent Number: 4,637,704
[45] Date of Patent: Jan. 20, 1987

[54] EXCHANGEABLE LENS WHICH EXCHANGES ELECTRICAL SIGNALS WITH A CAMERA BODY

[75] Inventors: Toshihiko Ishimura, Habikino; Yukio Maekawa, Sakai, both of Japan

[73] Assignee: Minolta Camera Kabushiki Kaisha, Osaka, Japan

[21] Appl. No.: 799,756

[22] Filed: Nov. 19, 1985

[30] Foreign Application Priority Data

Nov. 19, 1984 [JP] Japan ................................ 59-175426[U]

[51] Int. Cl.⁴ .............................................. G03B 17/12
[52] U.S. Cl. ..................................... 354/286; 354/289.12
[58] Field of Search .......................... 354/286, 288, 289

[56] References Cited

U.S. PATENT DOCUMENTS

| | | | |
|---|---|---|---|
| 4,357,089 | 11/1982 | Okura et al. | 354/286 |
| 4,440,484 | 4/1984 | Komoto et al. | 354/286 |
| 4,448,509 | 5/1984 | Katsuma et al. | 354/286 |
| 4,457,609 | 7/1984 | Tomino et al. | 354/286 |
| 4,464,034 | 8/1984 | Tomino | 354/286 |

FOREIGN PATENT DOCUMENTS 55-31240 2/1980 Japan .
58-83824 5/1983 Japan .

Primary Examiner—Donald A. Griffin
Attorney, Agent, or Firm—Wolder, Gross & Yavner

[57] ABSTRACT

An exchangeable lens to be mounted on a camera body by the rotation of the lens barrel is provided with a plurality of terminals arranged circularly along the circumference of the lens barrel about the optical axis of the lens barrel and are connected to a CMOS circuit in the lens. The terminals include a power supply terminal and a ground terminal through which electric power is supplied from the camera and a signal terminal through which a signal is transmitted between the camera body and the lens. The power supply terminal and the ground terminal are arranged to come into contact with their corresponding camera terminals in advance of the signal terminals when the lens is rotated to mount it on the camera body.

8 Claims, 14 Drawing Figures $P_3 < P_2$

EXCHANGEABLE LENS WHICH EXCHANGES ELECTRICAL SIGNALS WITH A CAMERA BODY

BACKGROUND OF THE INVENTION

1. Field of the Invention

The present invention relates to an exchangeable lense to be mounted on a camera through a bayonet mount mechanism, and more particularly to an exchangeable lense provided with a group of terminals through which electrical signals are transmitted and electric power is supplied from the camera body to the exchangeable lens.

2. Description of the Prior Art

A known exchangeable lens of the above mentioned type such as disclosed in a Japanese laid-open patent application with the laid-open No. 58-83824, is provided with a plurality of electric terminals arranged circularly along the circumference of the lens barrel about the optical axis of the lens. These terminals are arranged to enable desired exchange of electric signals between the camera body and the exchangeable lens when the exchangeable lens has been turned to a completely attached mounted position relative to the camera body with the terminals on the lens having been brought into registration with corresponding terminals on the camera body. To this end, the terminals on the exchangeable lens and the terminals on the camera body are respectively arranged circularly about the optical axis mutually at corresponding positions such that all the respectively corresponding terminals come into contact with each other simultaneously just before the completion of the coupling of the exchangeable lens to the camera body.

In cases where an electric power supply system is arranged such that the electric power is supplied from the camera body through the above stated terminals to the exchangeable lens circuit, it is desirable that the lens circuit consumes less electrical power. To this end, the lens circuit may comprise a CMOS (Complementary Metal Oxide Semiconductor). However, CMOS circuits have a defect in that they are susceptible to an undesirable circuit phenomenon known as "latch up" phenomenon. The latch up phenomenon occurs when the combination of the source, drain, input protection resistor, P-well, substrate, and the like constituting the CMOS acts as if it is a thyristor due to the triggering of a surge, or the like. A detailed analysis of the latch up phenomenon will be given later on. When the latch up phenomenon occurs, the power supply terminal and the ground terminal of the CMOS are short-circuited with each other, and an excessive flow of electric current is created. Since this condition continues until the power supply is interrupted, the power source of the camera body is rapidly exhausted. Further, it is likely to occur that the CMOS itself is broken by the excessive electrical current and the communication of the electric signal between the camera body and the exchangeable lens becomes impossible.

Generally, a protection resistor or a protection diode is provided for the input/output terminal to prevent the latch up phenomenon, however this countermeasure by itself is not completely effective in preventing the phenomenon.

SUMMARY OF THE INVENTION

It is an object of the present invention to provide an exchangeable lens detachably mountable on a camera body and including an electric circuit which is supplied with electric power from the camera body and which comprises a CMOS but is free from the latch up phenomenon.

It is another object of the present invention to provide an exchangeable lens which mechanically prevents said latch up phenomenon.

The exchangeable lens according to the present invention is mounted on a camera body with the lens barrel being manually rotated after its rear end is inserted into the aperture of the lens mount portion of the camera and is provided with a group of terminals which are to be connected with a group of terminals on the camera body. The terminals on the exchangeable lens are fixed on the lens barrel to rotate with the rotation of the exchangeable lens. The terminals on the exchangeable lens includes a power supply terminal and a ground terminal through which the electrical power is supplied from the camera body to the lens circuit, and which have widths determined such that they come into contact with their corresponding terminals on the camera body in advance of the other signal terminals.

According to the above construction, the latch up phenomenon is avoided in the lens circuit comprising a CMOS.

BRIEF DESCRIPTION OF THE DRAWINGS

FIG. 5b is an illustration of the cross-sectional structure of the circuit in FIG. 5a;

FIG. 6b is an illustration of the cross sectional structure of the circuit in FIG. 6a;

DETAILED DESCRIPTION OF THE PREFERRED EMBODIMENTS

Figure 1:
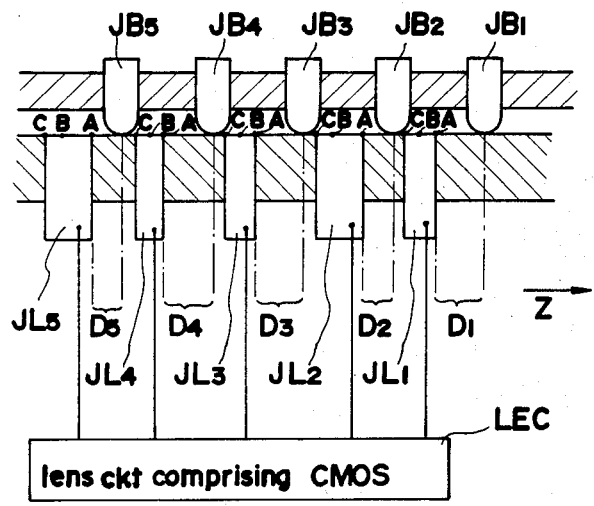
FIG. 1 is a cross-section showing the principal portions of the base of the invention.

FIG. 1 shows the basic construction of the present invention. In the Figure, a group of lens contacts or terminals JL1–JL5 is disposed in a single circular line around the optical axis of the lens (see FIG. 3), and a lens circuit LEC comprising a CMOS is connected to the terminals. The lens terminals JL1–JL5 respectively have widths in the direction of alignment, the widths being determined such that the terminals extend from effective contact commencing points A to at least final effective contact points B which contacts A and B are engaged by corresponding camera terminals JB1-JB5 first and finally during the mounting of the exchangeable lens. When the optical axes of the exchangeable lens and the camera body have been brought into alignment with each other but before the terminals on both sides come into contact with each other, e.g., while the exchangeable lens is being rotated relative to the camera body in the direction of the arrow Z illustrated in FIG. 1, the distances D1 through D5 between the effective contact commencing points A on the lens terminals and the contact points engaged by the camera terminals JB1 through JB5 are determined such that the distances $D_2$ and $D_5$ for a power supply terminal and a ground terminal are narrower than the distances $D_1$, $D_3$, and $D_4$ for electric signal terminals. The points C on the lens terminals in FIG. 1 indicate the edges opposite the effective contact commencing points A in the direction of alignment.

Figure 3:
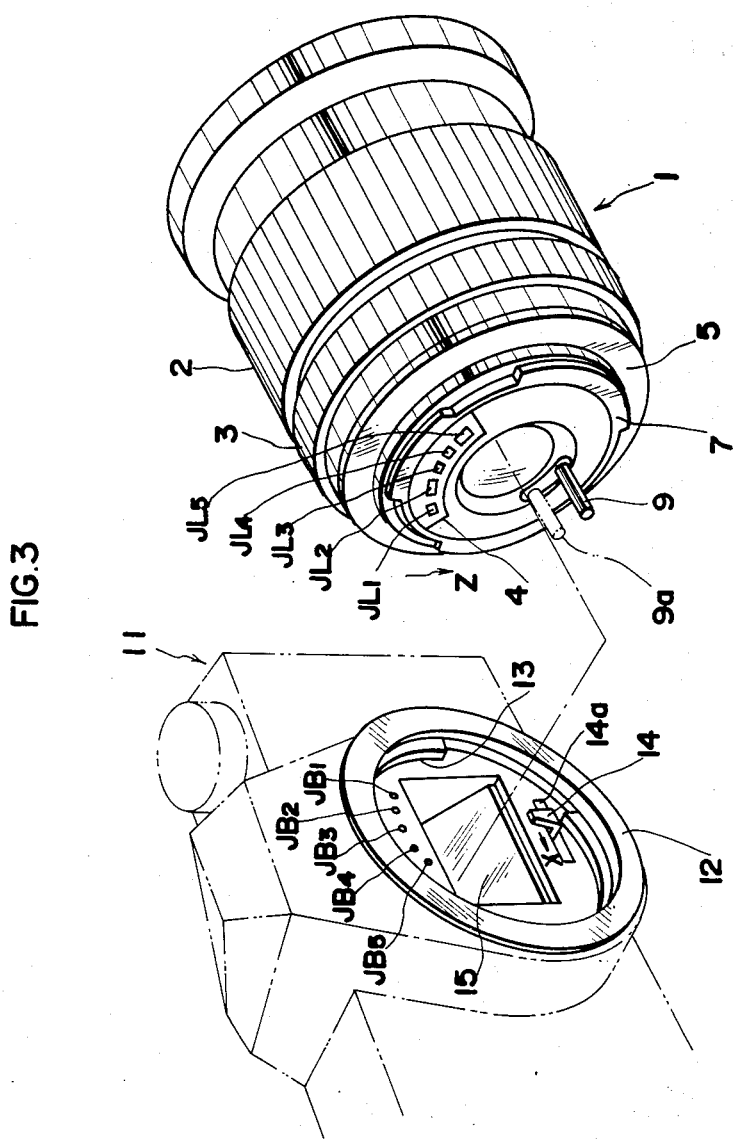
FIG. 3 is a perspective view of the principal parts of an exchangeable lens and a camera body in the camera system relating to the invention.

FIG. 3 is a perspective view showing the outer appearance of a zoom lens 1 as an example of an exchangeable lens according to the present invention, and a camera body 11 on which the zoom lens 1 is mounted. In the zoom lens 1, a focusing ring 2 is manually operated to adjust the focus of the lens. A zoom ring 3 is operated to adjust the focal length of the lens. In response to the rotation of the zoom ring 3, a sliding piece shown in FIG. 4 slides over a code pattern of a code panel FCP, which in turn outputs data commensurate with the focal length set by said zoom ring 3. At the rear end of the lens barrel is formed a mount plane 5 and bayonet pawls 7 for mounting the zoom lens 1 on the camera body 11. On the rear end plane of the lens barrel and at a location radially inwardly of the bayonet pawl 7, five electric terminals JL1 through JL5 are arranged along a circle concentric with the optical axis of the lens. A diaphragm stop-down pin 9 is urged in the direction of the arrow Z by a spring. The aperture of the diaphragm (not shown) is determined in accordance with the position of the pin 9. That is, when the pin 9 is at the position illustrated by the solid line, the diaphragm aperture assumes the smallest size (maximum aperture value), and when the pin 9 is at the position indicated by the broken line 9a, the diaphragm aperture is fully open.

The camera body 11 is formed with a mount plane 12 which comes into contact, with the lens mount plane 5 when the lens 1 is mounted on the camera. Terminals JB1 through JB5 are arranged circularly along the circumference of the camera mount about the optical axis so as to be brought into electrical connection with corresponding lens terminals JL1 through JL5 when the exchangeable lens is completely mounted on the camera body. Bayonet pawls 13 of the camera mount member engage the lens bayonet pawls 7 when the lens is mounted on the camera body 11. Although not shown in the figure, a lock member is provided to lock the lens at the final position where the lens 1 has been rotated to its end or fully coupled position in the direction of the arrow Z. A diaphragm control piece 14 is provided within the mount plane 12. When the lens 1 is mounted on the camera body 11, the diaphragm stop-down pin 9 engages a piece 14a. Accordingly, the aperture of the diaphragm is determined in accordance with the position of the piece 14a. The diaphragm control piece 14 is biased in the direction of the arrow X by a spring, and arrested at the position shown in the drawing except during an exposure control operation, so that the diaphragm is normally fully open. When an exposure control operation is commenced, the diaphragm control piece 14 is released from the arrested position and moves in the direction of the arrow X. Accordingly, the stop-down pin 9 also moves from its initial position 9a in the direction of the arrow Z and the diaphragm is stopped down. When the diaphragm control piece 14 moves by an amount corresponding to a desired number of steps of diaphragm stopping down, the diaphragm control piece 14 is arrested. Accordingly, the stop-down pin 9 is stopped to determine the aperture of the diaphragm.

A reflecting mirror 15 is normally at the viewing position as shown in FIG. 3. During the exposure operation, the reflecting mirror 15 is swung up and the light passing through the objective lens reaches the film.

Figure 2:
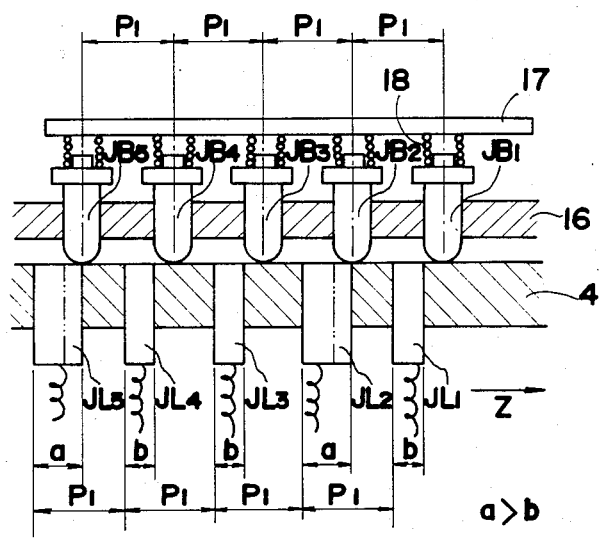
FIG. 2 is a cross-section of the principal parts of a first embodiment of the invention.
Figure 4:
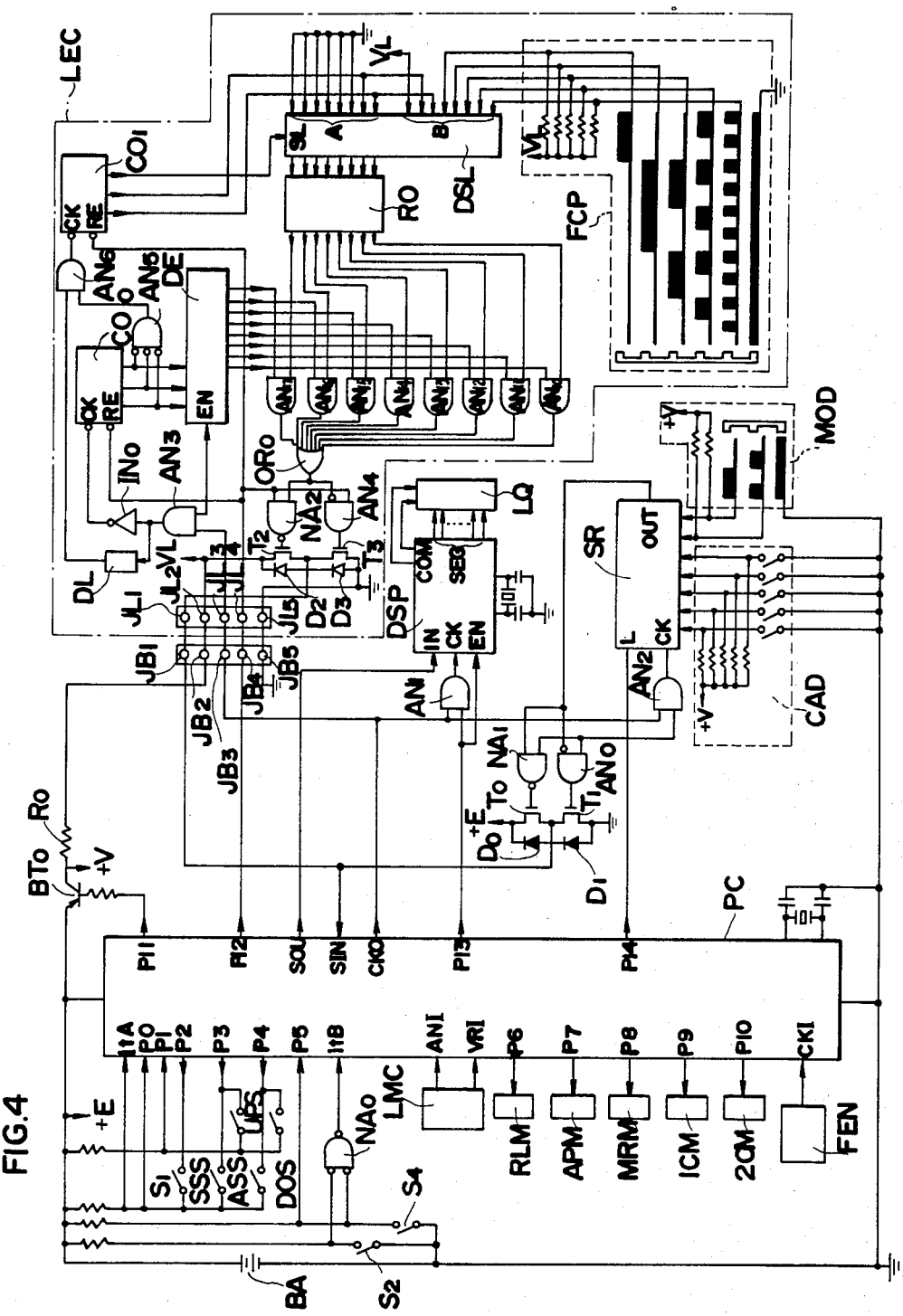
FIG. 4 is a circuit diagram of said camera system.

When the lens is mounted, the rear end portion of the lens 1 is inserted into the mount aperture of the camera body until the lens mount plane 5 comes into contact with the camera mount plane 12. Then, the lens is rotated in the direction of the arrow Z. The lens bayonet pawl 7 is pushed rearward by a spring (not shown) provided behind the camera bayonet pawl 13, and then at the final rotated position, the lens 1 is secured by a lock member (not shown). At this time, the terminals JB1 and JL1, JB2 and JL2, JB3 and JL3, JB4 and JL4, and JB5 and JL5 come into mutual contact. In FIG. 2, the camera body terminals JB1-JB5 slidably axially engage in corresponding through holes in an insulating plate 16 and are biased towards the lens by electrically conducting coil springs 18 which bear against a printed circuit board 17. The exchangeable lens terminals JL1 through JL5 are fixedly supported by an insulating plate 4 which is secured to the lens mount radially inwardly of the bayonet pawl 7. One end of each of the terminals JL1 through JL5 are exposed to make contact with the respective camera terminals JB1-JB5, and the other ends of said terminals are connected to lead wires. The lead wires are connected to the lens circuit LEC. The terminals JB1 and JL1 are used for the transmission of data from the lens to the camera, the terminals JB2 and JL2 are used for the electric power supply from the camera to the lens, the terminals JB3 and JL3 are used for the supply of synchronous clock pulses from the camera to the lens, the terminals JB4 and JL4 are used for the transmission of a chip selection signal from the camera to the lens in order to activate the circuit inside the lens, and the terminals JB5 and JL5 provide a common ground for the camera and the lens. In FIG. 4, an electric power source battery BA supplies electric power via a power line (+E) to a microcomputer PC, a display circuit DSP, a shift register SR, AND gates AN0, AN1, and AN2, and NAND gates NA0 and NA1.

A transistor BT0 is used for power supply control. The transistor BT0 conducts when the microcomputer PC starts its operation, and supplies electric power from a power supply line (+V) to a light measuring circuit LMC, a releasing magnet control circuit RLM, and a diaphragm stop-down magnet control circuit APM, a mirror magnet control circuit MRM, a first shutter curtain control magnet circuit 1CM, a second shutter curtain control magnet circuit 2CM, a stopdown pulse output circuit FEN, an ISO data detecting circuit CAD, and an exposure control mode data detecting circuit MOD. It is to be noted that the camera of the present embodiment is a single lens reflex camera with a focal plane shutter including first and second or leading and trailing shutter curtains. Further, upon conduction of the transistor BT0, electric power is supplied via a protection resistor R0 and the terminals JB2 and JL2 to a power supply line VL of a lens circuit LEC surrounded by a chain-dotted line. The protection resistor RO is provided to prevent a short-circuiting between the power supply terminal (+V) of the camera and the ground terminal when the terminal JB2 is touched by a tweezers or the like. Further, the camera circuit is composed of a CMOS except for the circuits LMC, RLM, APM, MRM, 1CM, 2CM, and FEN. The reason for the camera circuit being composed of CMOS is that in devices such as cameras or the like employing a battery as a power source, it is desirable that the consumed current is as little as possible.

The microcomputer PC starts to read the data from the lens circuit LEC. First, the content of a register K is made "0" and a terminal P12 is made "High". The register K selects one of the registers LDR0 through LDR5 in accordance with the content of the register K. If the content of K is "0", the register LDR0 is selected, if "1" then LDR1, if "2" then LDR2, if "3" then LDR3, if "4" then LDR4, if "5" then LDR5. When the potential at the terminal P12 is "High", this "High" signal is transmitted via terminals JB4 and JL4 to the lens circuit LEC. The AND gates AN3 and AN4, the NAND gate NA2, and a decoder DE are put into an activated condition by this signal, and further the reset condition of the counters CO0 and CO1 is cancelled. Then, the microcomputer PC performs a serial data input/output operation. That is, the microcomputer PC sequentially reads lens data coming from the lens into a data input terminal SIN via terminals JL1 and JB1 in synchronization with the negative going edge of the clock outputs from the clock output terminal CK0, stores the read data to a register LDRK, and adds "1" to the register K, and then repeats the entire operation until the content of the register K reaches "6". Accordingly, six kinds of lens data are read in by the microcomputer PC and stored in the registers LDR0-LDR5.

The counter CO0 in the lens circuit LEC is a three bit counter. The counter CO0 counts the negative going edges of the clock output from the clock output terminal CK0 and transmitted through terminals JB3 and JL3, and AND gate AN3, and reversed by an inverter IN0. Then, the decoder DE outputs a "High" signal in accordance with the output of the counter CO0 to each of the output terminals in sequence from the left to right terminals, thereby sequentially activating the AND gates AN10 through AN17. Accordingly, from one negative going edge of the clock to the next negative going edge, one of the AND gates corresponding to the clocks is activated and outputs one bit of data.

Further, when the counter CO0 counts the eighth clock pulse, all the outputs of the counter CO0 become "Low" and accordingly, the output of the AND gate AN5 becomes "High", and the AND gate AN6 is activated. Clock pulses which are output from the AND gate AN3 are delayed by a delay circuit DL and input to the counter CO1 through the AND gate AN6. The negative going edges of said clock pulses are counted by the counter CO1. The delay circuit DL is provided to prevent a pulse from being output from the AND gate AN6 during the initial positive going edge of the clock. Accordingly, one clock cycle is counted for every eight clock inputs. A data selector DSL outputs data to be input to a group of terminals A when the highest bit of the counter CO1 is "Low" and which outputs data to be input to another group of terminals B when the highest bit of the counter CO1 is "High". A ROM (read only memory) RO has a permanent memory of various lens data at each address. The addresses of the ROM RO is specified in accordance with the data from the data selctor DSL. Accordingly, a data permanently written in a specified address is output through the AND gates AN10 through AN17 one bit at a time sequentially from the lowest bit. The data output from the AND gates AN10 through AN17 are output from an OR gate OR0. When the output of the OR gate OR0 is "High", a FET T2 conducts and the "High" signal is input to the data input terminal SIN via the terminals JL1 and JB1. When the output of the OR gate OR0 is "Low", a FET T3 conducts and a "Low" signal is input to the data input terminal SIN via the terminals JL1 and JB1.

An explanation will be given below about why latch up does not occur in the lens circuit LEC comprising a CMOS with the arrangement of the lens side terminals as shown in FIG. 2.

Figure 5B:
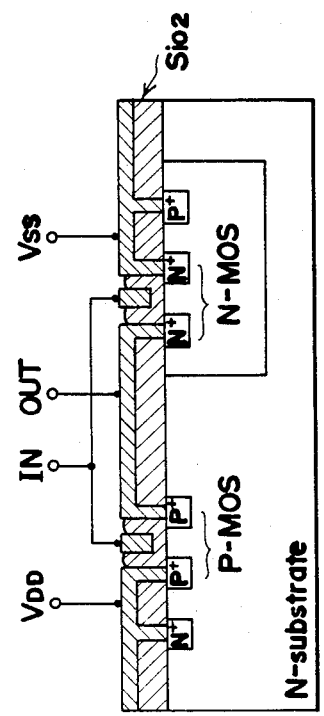
Figure 6B:
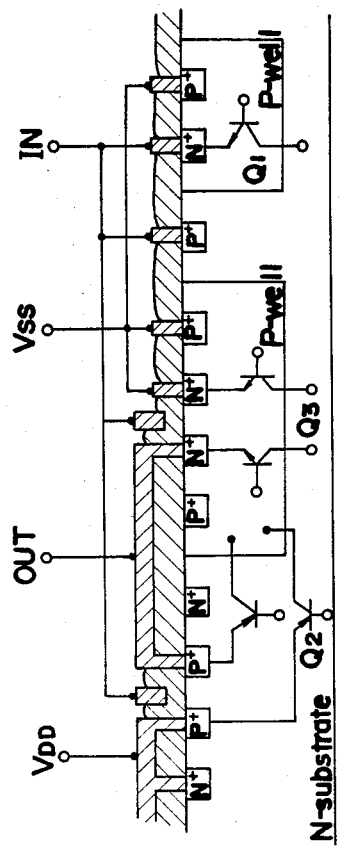
Figure 5A:
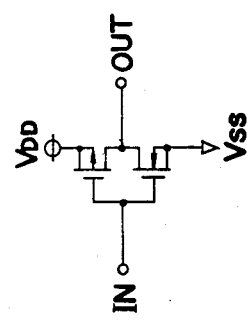
FIG. 5a is a basic circuit diagram of an inverter circuit of a CMOS.
Figure 6A:
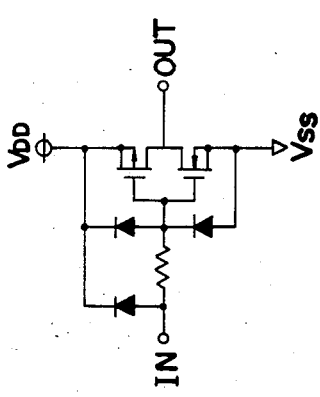
FIG. 6a is a circuit diagram showing the practical circuit of a CMOS inverter.
Figure 7:
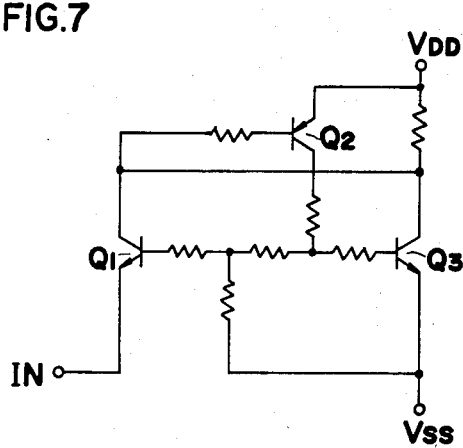
FIG. 7 is a diagram of an equivalent circuit of a thyristor formed according to a parasitic transistor which is created by the structure shown in FIG. 6b.

An explanation of the latch up phenomenon peculiar to CMOS circuits will be given first. FIGS. 5(a) and 5(b) illustrate respectively, a basic circuit and a structure of a CMOS inverter circuit. As shown in FIG. 6(a), an input protecting resister and an input protecting diode are usually added to the circuit in order to protect against static electricity and the like. FIG. 6(b) is a cross-sectional structural diagram thereof. As shown in FIG. 6(b), parasitic transistors Q1, Q2, and Q3 are formed. FIG. 7 shows an equivalent circuit formed by the parasitic transistors and which forms a thyristor. When the voltage level VIN at the input terminal IN satisfies, for example, the condition VIN<VSS (GND), a positive feed back circuit is formed between the transistors Q1 and Q2 shown in FIG. 7, the terminal VDD is short-circuited with the terminal VSS (GND) resulting in extremely large electrical current flowing continuously therebetween. This condition is not cancelled as long as the power supply is continued. The same may also be said of the circuit between the voltage levels at the output terminal VOUT and terminal VDD, or between the terminals VOUT and VSS.

Figure 8:
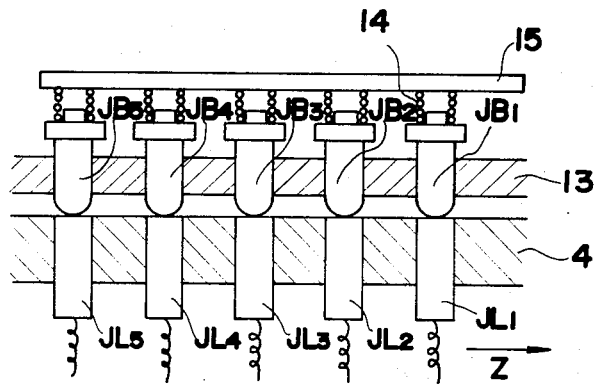
FIG. 8 is a cross-section showing the principal parts of a terminal configuration in which the present invention is not employed.

When the lens is attached to the camera and rotated to the final rotational position, the lens terminals JL1 through JL5 are also rotated in the direction Z, and, as shown in FIG. 8, make contact with the respective camera terminals JB1-JB5. With reference to FIG. 8, the lens terminals JL1-JL5 are shown to be arranged at identical pitch and with the same width. However due to the dispersion of the sizes of the parts in actual manufacturing, the width and pitch of each of terminals JL1 through JL5 will vary. Further, it is also very difficult in the course of assembly to eliminate dispersion or variations in the installing positions of the terminals JL1 through JL5 in the insulating plate 4, and the insulating plate 4 to the lens mount. Similar dispersion will occur in the sizes and installed positions of the camera terminals JB1 through JB5. Furthermore, there are also variations in the inclination of the camera terminals during the rotation of the lens. Consequently, it can not be determined which of the terminals JL1-JL5 will make contact and conducts with the corresponding camera terminal first. If the data transmission terminals JL1 and JB1, the synchronous clock pulse terminals JL3 and JB3, or the chip select terminals JL4 and JB4 make first contact with each other before the power supply terminals JL2 and JB2 or the common ground terminals JL5 and JB5 make contact with each other, the input level VIN to the CMOS will, as an example, become VIN<VSS so that the lens circuit will become transiently unstable, and a latch up condition will result. Consequently, a short circuiting will result between terminals VDD (VL) and VSS (GND) in the lens circuit resulting in the lens circuit breaking down. Additionally, the circuit in the camera body may also be broken as a result. Particularly, in cameras supplied with electric power from a battery, the battery will be rapidly exhausted and its life time is shortened. Furthermore, the data stored in the ROM of the lens can not be read out and the functions of the camera can not be attained.

FIG. 2 shows an embodiment of the present invention. The pitch of the lens terminals JL1 through JL5 is identical to the pitch of the camera side terminals JB1 through JB5, however, the widths a of the power supply terminal JL2 and the common ground terminal JL5 are greater than the widths b of the other terminals JL1, JL3, and JL4 with respect to the direction Z of rotation. When the lens is attached to the camera and rotated relative thereto, latch up does not occur even if there are variations or dispersions of the sizes and positions as described above, because the electric power supply terminals JL2 and JB2 and the common ground terminals JL5 and JB5 make contact with each other and begin communication in advance of the other input-/output terminals without fail.

Figure 12:
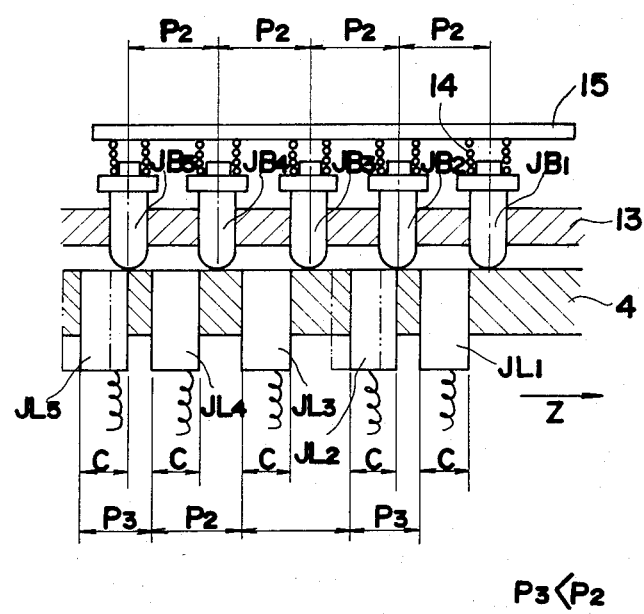
FIG. 12 is a cross-section of a second emvodiment of the invention.

FIG. 12 is a second embodiment, and although all the widths C of the lens terminals JL1 through JL5 are the same, the pitch P3 between the power supply terminal JL2 and the data transmission terminal JL1, and the pitch between the common ground terminal JL5 and the chip select terminal JL4 are smaller than the pitch P2 of the camera terminals JB1 through JB5, and the chip select terminal JL4 and the synchronous clock pulse terminal JL3. The pitch between the synchronous clock pulse terminal JL3 and the power supply terminal JL2 is larger than the pitch P2 only in such an amount that the pitch between JL2 and JL1 is made smaller than said P2. In other words, the power supply terminal JL2 and the common ground terminal JL5 are shifted in the direction Z of rotational attachment. When the lens is attached to the camera and is rotated, the power supply terminals JB2 and JL2 and the common ground terminals JB5 and JL5 begin communication in advance of the other terminals in a manner similar to that shown in the embodiment of FIG. 2 and provide a countermeasure to the latch-up effect of similar nature.

Next, an explanation will be given of the relationship between the data stored in the ROM RO and the addresses in said ROM RO, and of the address specifying operation.

TABLE 1

| Counter (CO1) | Address | Data | Register |
|---|---|---|---|
| 000 | 000 00000 | Check data | LDR0 |
| 001 | 000 00001 | Avo (full aperture value) | LDR1 |
| 010 | 000 00010 | Avmax (maximum aperture value) | LDR2 |
| 011 | 000 00011 | Wv (full aperture metering error) | LDR3 |
| 100 | 100***** | Avz (zoom aperture value deviation) | LDR4 |
| 101 | 101***** | Fv (focal length) | LDR5 |

Table 1 shows the relationship between the output of the counter CO1, the addresses of the ROM RO specified by the output of said counter, the data written to said specified addresses, and the registers in the computer in which this data is stored. The counter CO1 increases one count for every eight clock pulse inputs. Initially, the counter CO1 has an output of "000". Accordingly, address data "000 00000" from the group of input terminals A is output to the ROM RO from the data selector DSL. Then, check data common to all exchangeable lenses (for example, "10101010") is sent to the camera body from the ROM RO. When output of the counter CO1 is "001", address data "00000001" from the input terminals A is output from the data selector DSL, and full aperture value data Avo is output from the ROM RO. In the case of zoom lenses in which the diaphragm aperture varies with a change of the focal length, data of the full aperture value at the shortest focal length, that is the minimum aperture value, is output. When the output of the counter CO1 is "010", address data "00000010" from the input terminals A is output from the data selector DSL, and data of the maximum aperture value Avmax (the aperture value when the diaphragm is at its minimum diameter) is output from the ROM RO. In the case of the zoom lenses of which aperture value varies with the focal length, this maximum aperture value is output along with the maximum aperture value data at the shortest focal length. When the output of the counter CO1 is "011", the data selector outputs address data "00000011", and full aperture metering error data Wv i,e, the data indicating the error in the light measurement at the full aperture. When the output of the counter CO1 is "100", address data "100 ***" from the input terminals B is output from the data selector DSL. The five bit data indicated by "*" is output from the code panel FCP in accordance with the focal length determined according to the focal length selecting ring 3. The data corresponding to the deviation of the aperture value at a selected focal length from the aperture value at the shortest focal length is stored at the above stated address. Further, in the case of zoom lenses in which the diaphragm aperture does not change with the focal length, data "00000000" is written in the memory. For fixed focal length lenses, the code panel and the data selector are not provided, the ROM RO address is specified at "00000100", and data "00000000" is output from the ROM RO. When the output of the counter CO1 is "101", the data selector DSL outputs data "101 ***" from the input terminals B, and the ROM RO outputs Fv data corresponding to the focal length determined by the focal length or zoom ring 3. With fixed focal length lenses, the address "00000101" is specified and the fixed focal length data Fv is output.

Figure 9:
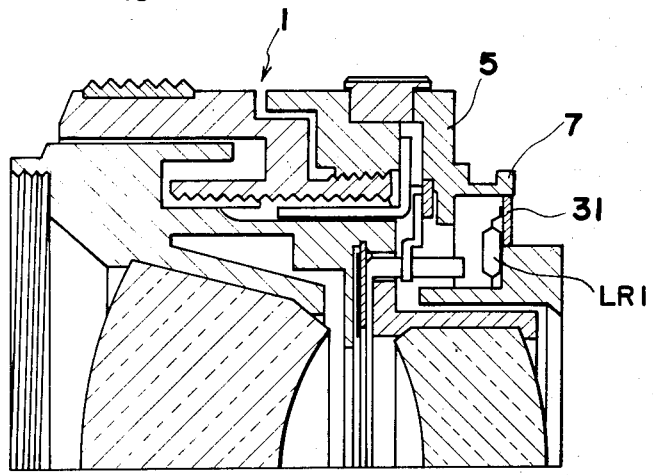
FIG. 9 is a cross-sectional view showing the upper half of an exchangeable lens in which the present invention is employed.
Figure 10:
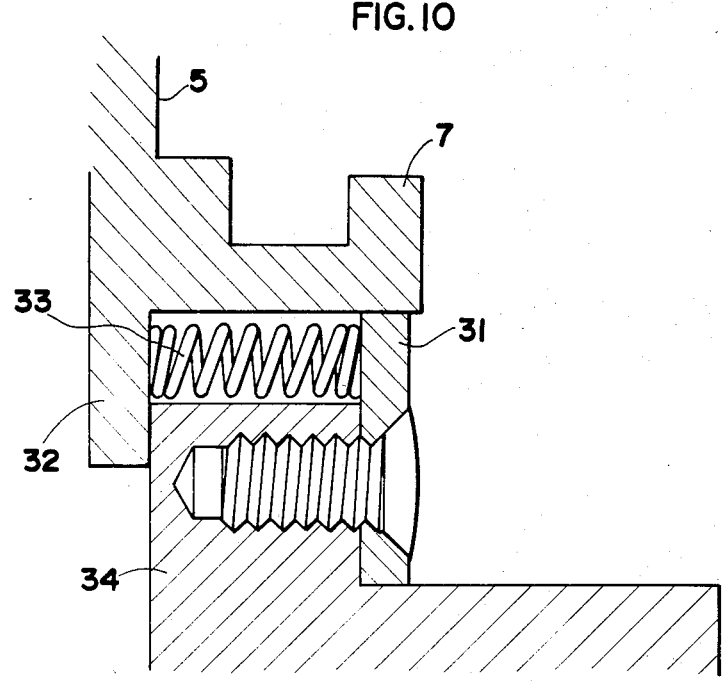
FIG. 10 is an enlarged cross-sectional view of the principal parts of FIG. 9.
Figure 11:
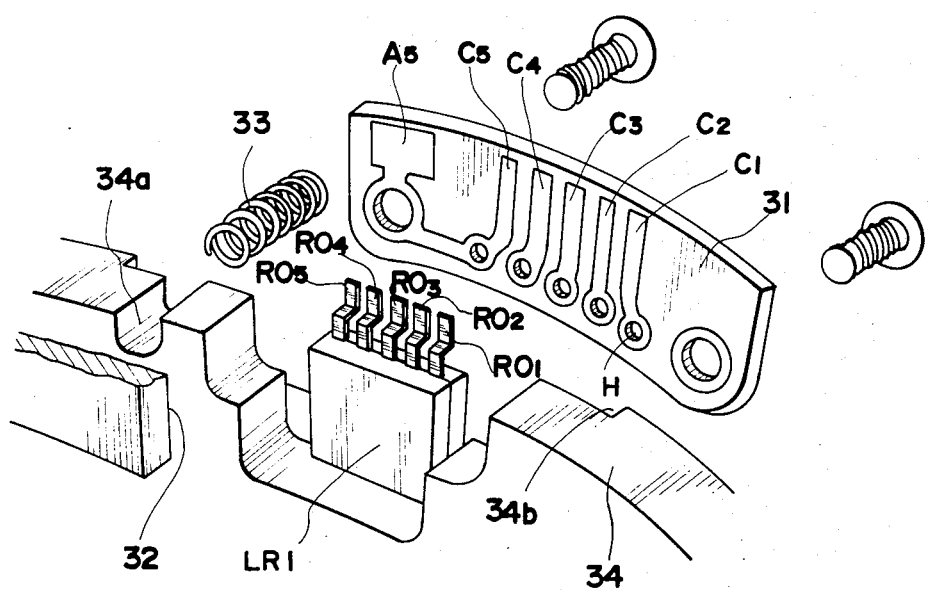
FIG. 11 is an exploded perspective view of FIG. 10.

With reference to FIGS. 9 through 11, an explanation will be given of a countermeasure effective in eliminating, as much as possible, the breakdown of the above stated lens circuit due to static electricity.

The lens circuit LEC is entirely packed in a single IC LRI, with the terminals RO1 through RO5 being soldered, respectively, to the terminals C1 through C5 of the base plate 31. The terminals C1 through C5 are connected via through-holes H with the above described terminals JL1–JL5 on the opposite face. The terminal C5 connected with the common ground terminal JL5 is connected to terminal A5 by a conducting pattern on the base plate 31. The base plate 31 is secured in the recess 34b of the insulating block 34 with securing screws, and the insulating block 34 is, in turn, secured to a lens mount 32 by a screw, or the like. An elongated groove 34a is formed on the insulating block 34 at a position corresponding to the terminal A5, and an electrically conductive spring 33 is fitted in said groove 34a. Accordingly, when the insulating block 34 and the base plate 31 are secured to the mount 32, the terminal A5 and the mount 32 are joined electrically by the electrically conductive spring 33. When a person highly charged with static electricity touches parts of the lens body such as the mount, since the common ground terminal RO5 of the lens circuit LEC has the same electrical potential as the mount due to the relationship of the spring 33, the terminal A5, and the terminal C5, only a minute amount of electric current flows in the lens circuit LEC, and the terminals RO1-R05 are at almost the same electrical potential.

Breakdowns of the transistors, diodes, and the like in the lens circuit will be reduced and breakdown damage to the circuit will be further obviated.

The above and other related objects and features of the invention will be apparent from a reading of the following description of the disclosure found in the accompanying drawings and the novelty thereof pointed out in the appended claims.

What is claimed is:

1. An exchangeable lens for use with a camera provided with a plurality of terminals which are arranged in a circle, said lens comprising:
    a lens barrel to be mounted on the camera body by the rotation thereof in a given direction;
    a plurality of terminals fixed on said lens barrel and arranged circularly on said lens barrel concentric with the optical axis of said lens to be brought into mutual contact with corresponding terminals of said camera body respectively, said terminals on said lens barrel including a power supply terminal and a ground terminal through which electric power is supplied from said camera body, and signal terminals through which signals are exchanged between said lens and said camera body;
    a CMOS circuit connected to said terminals of said lens and functioning to produce signals upon receiving electric power through said power supply terminal and ground terminal; and
    each of said terminals on said lens barrel extending for contact along the direction of rotation of said lens barrel and having a contact commencing point which first comes into contact with a corresponding terminal of said camera body, during the rotation of said lens barrel attendant for the mounting thereof on said camera body, the locations of said contact commencing points of said terminals being such that said power supply terminal and said ground terminal come into contact with their corresponding terminals on said camera body in advance of said signal terminals.

2. The lens according to claim 1, wherein said terminals on said camera body are arranged at the same pitch, and said power supply terminal and said ground terminal along are wider than said signal terminals the direction of rotation of said lens barrel.

3. The lens according to claim 1, wherein said terminals on said camera body are arranged at same pitch, and said terminals on said lens barrel are arranged at different pitches from each other.

4. The lens according to claim 1 further comprising a connecting member for electrically connecting said ground terminal with said lens barrel.

5. The lens according to claim 4, wherein said connecting member includes a base plate having a first surface which contains said terminals of said lens and a second surface on which are provided soldering terminals for said CMOS circuit connected to said terminals of said lens and a contact terminal connected to said ground terminal, an insulating member interposed between said base plate and said lens barrel for insulating the second surface of said base plate from said lens barrel, said insulating member having a groove extending therethrough from the base plate side surface thereof to the lens barrel side surface thereof at a position corresponding to that of said contact terminal, and
    an electrically conductive member located in said groove of said insulating member for connecting said contact terminal to said lens barrel.

6. The lens according to claim 1, wherein said lens barrel includes a bayonet mount member having bayonet pawl for engaging with said camera body, and said terminals of said lens are located at positions radially inwardly said bayonet pawl.

7. In a camera including a camera body having a lens mount and an interchangeable lens separably coupled to said lens mount and rotatable about the optical axis of said lens between a mount release position and an advanced fully coupled position:
    an electric power supply housed in said camera body and including a power output terminal:
    a first circuit housed in said camera body and having a first signal terminal;
    a group of first contacts located on the lens mount along an arcuate locus concentric with said optical axis, at least one of said contacts being connected to said electric power output terminal and at least one other of said contacts being connected to said first signal terminal;
    a second circuit containing a CMOS housed in said interchangeable lens and including an electric power input terminal and a second signal terminal; and
    a group of second contacts located in said interchangeable lens along an arcuate locus concentric with said optical axis, at least one of said contacts being connected to said second circuit electric power input terminal and at least one other of said second contacts being connected to said second signal terminal in the advance fully coupled position of said lens mount, said electric power contacts being mutually electrically engaged and said signal contacts being mutually electrically engaged and characterized in that said first and second contacts are so spatially related that in the release position of said lens they are mutually disengaged and as said lens is advanced towards its lens mount full coupled position said electric power contacts are mutually electrically engaged in advance of the mutual electrical engagement of said signal contacts.

8. The camera of claim 7 wherein said electric power supply includes a ground terminal and said second circuit includes a ground terminal, said group of first contacts includes a first ground contact connected to said electrical power supply ground terminal, said group of second contacts including a second ground contact connected to said second circuit ground terminal, said ground contacts being mutually engaged in the fully coupled position of said lens and in the rotation of said lens barrel from its release toward its fully coupled position said ground contacts are mutually electrically engaged in advance of the mutual electrical engagement of said signal contacts.

* * * * *